United States Patent [19]

Grimminger et al.

[11] Patent Number: 4,984,977
[45] Date of Patent: Jan. 15, 1991

[54] SCREW-TYPE EXTRUDER HAVING A STARTING VALVE AND THROTTLE

[75] Inventors: Albert Grimminger; Wolfgang Lauser, both of Leonberg; Franz J. Müller, Bietigheim-Bissingen; Gerhard Pfaff; Edgar Schlipf, both of Stuttgart, all of Fed. Rep. of Germany

[73] Assignee: Werner & Pfleiderer, GmbH, Stuttgart, Fed. Rep. of Germany

[21] Appl. No.: 341,566

[22] Filed: Apr. 21, 1989

[30] Foreign Application Priority Data

May 10, 1988 [DE] Fed. Rep. of Germany ....... 3815897

[51] Int. Cl.⁵ .................. B29C 47/10; B29C 47/92
[52] U.S. Cl. ............................ 425/145; 425/185; 425/186; 425/382.3; 425/382.4
[58] Field of Search ............ 425/196, 185, 204, 376.1, 425/382.4, 145, 182, 382.3, 186; 137/625.17, 872, 873, 876; 264/209.8

[56] References Cited

U.S. PATENT DOCUMENTS

| 3,236,253 | 2/1966 | Symmons | 137/625.17 |
| 3,589,163 | 6/1971 | Byrne et al. | 425/185 |
| 4,136,968 | 1/1979 | Todd | 425/204 |
| 4,213,747 | 7/1980 | Friedrich | 425/146 |
| 4,283,168 | 8/1981 | Miller et al. | 425/382.3 |
| 4,416,605 | 11/1983 | Konno et al. | 425/185 |
| 4,507,072 | 3/1985 | Gaul, Jr. | 425/185 |
| 4,846,651 | 7/1989 | Matsuda et al. | 425/145 |

FOREIGN PATENT DOCUMENTS 1231001 7/1967 Fed. Rep. of Germany.
1937862 2/1971 Fed. Rep. of Germany.
2121305 9/1972 Fed. Rep. of Germany.

Primary Examiner—Jay H. Woo
Assistant Examiner—James P. Mackey
Attorney, Agent, or Firm—Laff, Whitesel, Conte & Saret

[57] ABSTRACT

A screw-type extruder has a housing and at least one screw which is rotatably arranged in a bore in the housing and which conveys material while melting or plasticizing in a conveying direction to a discharge channel, a starting valve and a throttle for generating a back pressure on the molten or plasticized material being arranged in the area of the discharge channel. In order to avoid long flow paths of the molten or plasticized material via the throttle and starting valve, there is provided a starting valve/throttle unit having a starting valve and throttle body which is displaceable at right angles to the conveying direction out of a starting position into a throttling position.

6 Claims, 4 Drawing Sheets

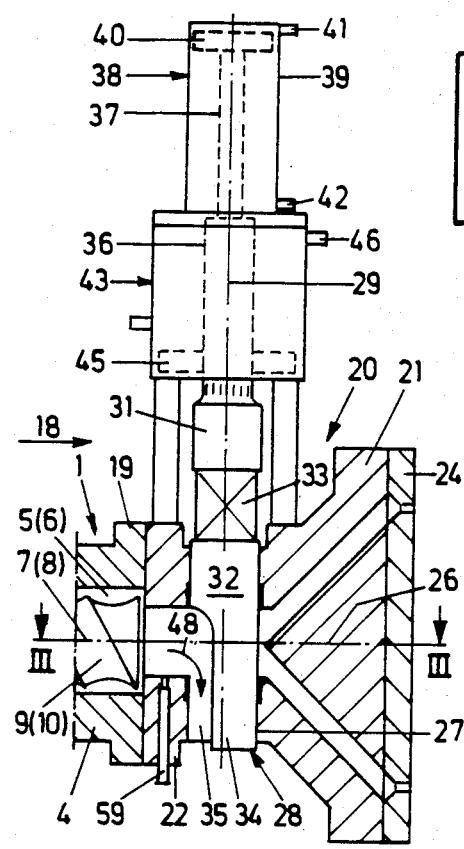
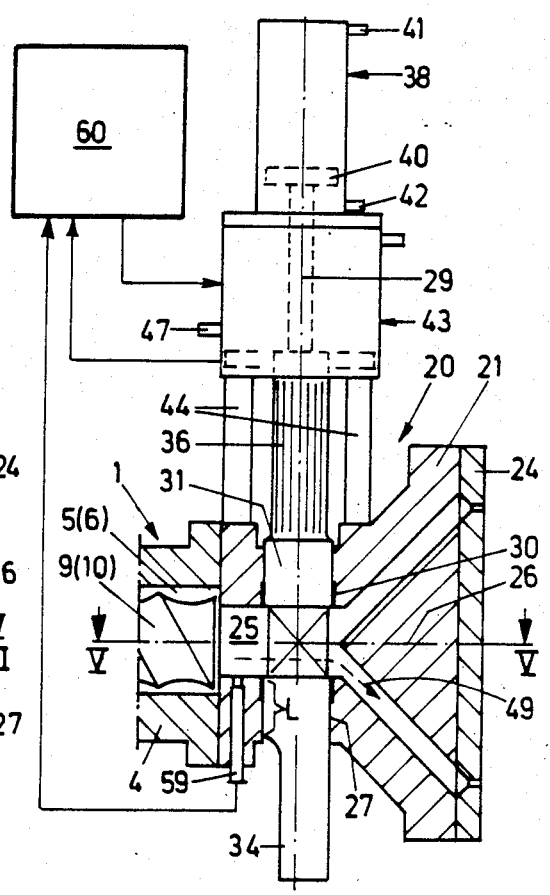
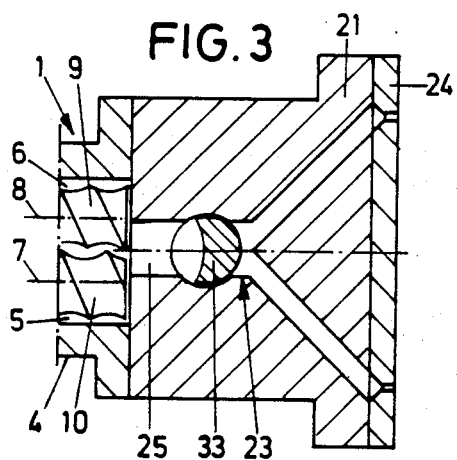
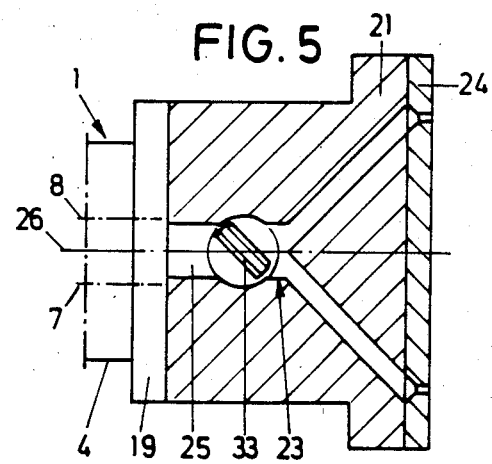

SCREW-TYPE EXTRUDER HAVING A STARTING VALVE AND THROTTLE

FIELD OF THE INVENTION

The invention relates to a screw-type extruder comprising a housing and at least one screw which is rotatably arranged in a bore of the housing and which conveys material while melting or plasticizing in a conveying direction to a delivery channel, a starting valve and a throttle for generating a back pressure on the molten or plasticized material being arranged in an area of the delivery channel.

BACKGROUND OF THE INVENTION

Particularly when processing materials which are sensitive to shear and dwell time, for example commercial plastics or food compounds, on screw-type machines, that is particularly extruders, it is often necessary to influence the plasticizing or melting of these materials or the temperature thereof and other parameters by a throttling action at the end of the machine before the plasticized or molten materials are discharged. Furthermore, it is necessary to some extent to provide so-called starting valves which enable the materials to be channeled out of the machine during the starting operation until the plasticizing or melting process is set in such a manner that the material can be fed to the standard discharge element, that is for example an extrusion die, where it is brought into any form, for example for granulating. The normally used tandem arrangement of the throttle on one side and starting valve on the other side results in relatively long material flow paths in the discharge elements, which is unacceptable particularly in the case of materials sensitive to dwell time because the material can suffer thermal damage. In addition, deposits of the material on the discharge channel walls can occur.

A screw-type machine is known from German published patent application No. 21 21 305, in which discharge channel a throttle body is arranged, which throttle body can be actuated via a drive arrangement at right angles to the conveying direction. A starting valve is not provided in this case.

A screw-type machine having a so-called vane-type throttle is known from German patent specification No. 28 33 057 (corresponding to U.S. patent application Ser. No. 819,227), which throttle is arranged in a double screw bore and can be pivoted by pivoting movements about its longitudinal axis into positions having a variable throttling effect.

German published patent application No. 19 37 862 discloses a screw-type machine with a starting valve arranged in the discharge channel which allows the molten material alternately to be drawn off through a starting outlet opening or fed to the discharge element, for example an extrusion die. A throttle is not provided in this case.

SUMMARY OF THE INVENTION

It is an object of the invention to develop a screw-type extruder of the type as defined in such a manner that long flow paths of the molten or plasticized material via the throttle and starting valve are avoided.

This problem is solved in accordance with the invention by providing a starting valve/throttle unit having a starting valve and a throttle body. An essential feature of the invention is that the starting valve, on the one hand, and the throttle, on the other, are combined to form a unit and can be operated conjointly. The operation of the starting valve and throttle body results in the switchover from starting operation to normal throttling operation at only one point.

According to an advantageous embodiment of the invention the starting valve and throttle body is displaceable at right angles to the conveying direction out of a starting position into a throttling position. This development is very advantageous because no movements of the starting valve and throttle body in the flow direction of the molten material are necessary. The entire discharge area can therefore be designed to be very compact with very short flow paths. In particular, also the connection to the at least one bore receiving the screw can be direct and very close. For this purpose the starting valve and throttle body is arranged so as to be displaceable in a guiding and starting bore in a valve/throttle housing, which bore passes through the delivery channel.

Further advantages and features of the invention will become apparent from the following description of exemplary embodiments taken in conjunction with the drawing.

BRIEF DESCRIPTION OF THE DRAWINGS

FIG. 2 shows in a vertical central section the end of the screw-type extruder having a starting valve/throttle unit, the unit being switched to the starting operation, FIG. 3 is a cross-section through FIG. 2 corresponding to the section line III—III in FIG. 2, FIG. 4 is a view corresponding to FIG. 2, the unit being switched to the throttling operation, FIG. 5 is a cross-section through FIG. 4 along the section line V—V.

DESCRIPTION OF THE PREFERRED EMBODIMENTS

Figure 1:
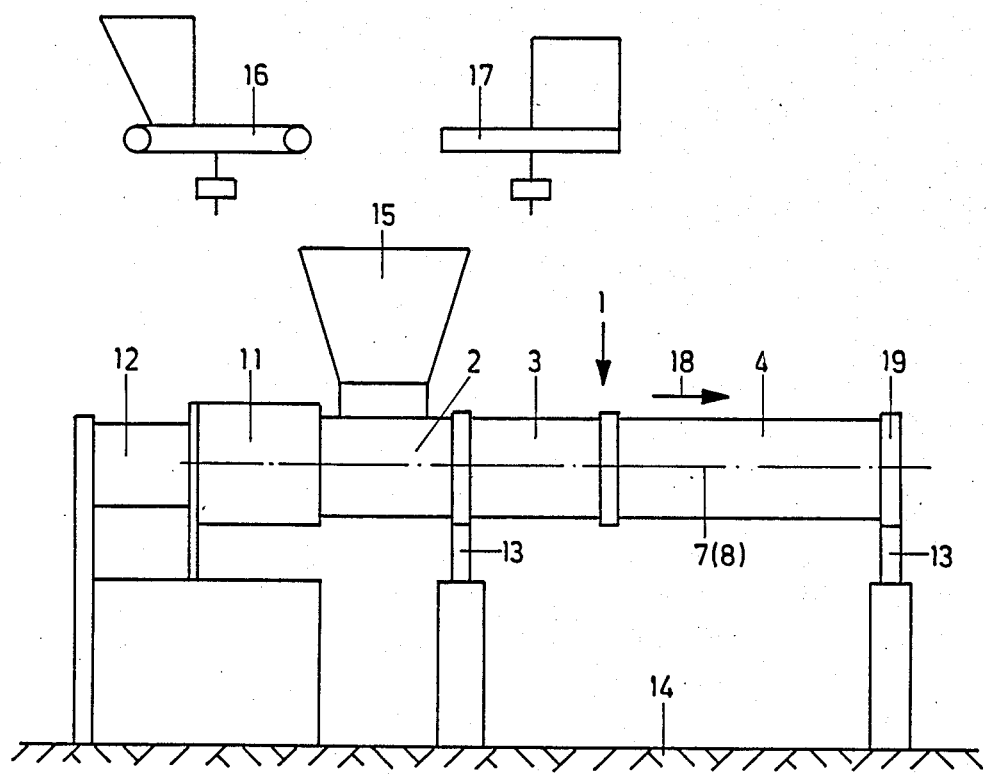
FIG. 1 shows a conventional screw-type extruder without a starting valve/throttle unit being provided at its discharge end.

The twin screw extruder shown in the drawing has a housing 1 consisting of a plurality of sections, so-called housing rings 2, 3, 4 which are in an axial tandem arrangement and flanged to one another. In the housing 1 there are formed two axially parallel bores 5, 6 which penetrate one another in the manner of a prone "8". Mounted in the housing 1 concentrically with the axes 7, 8 of the bores 5, 6 are two meshing screws 9, 10 which are driven by a motor 12 via a gearing 11. The housing 1, the gearing 11 and the motor 12 are supported relative to the ground 14 by way of supports 13. A receiving hopper 15 opens into the first housing section 2 which serves as the feed zone, into which hopper material for processing is fed, for example, via a metering unit 16 in the form of a belt weigher, for example for granular material and/or a metering unit 17 in the form of a metering screw, for example for metering powder.

A kneading zone can be formed in the housing 1, for example in the housing ring 4. Screw-type extruders of this type are generally known.

A starting valve/throttle unit 20 is flange-mounted on the end which is in the rear position in the conveying direction 18, i.e. on the discharge element of the housing 1, i.e. on that flange 19 of the last housing ring 4 which is remote from the receiving hopper 15. This unit has a valve/throttle housing 21, of which the flange 22 is bolted to the flange 19 of the housing 1. In the housing 21 there is formed a discharge channel 23 which directly follows the bores 5, 6 and which can by cylindrically formed directly adjacent to the bores 5, 6 and then expands—as is evident from FIGS. 2 to 5 and 8, 9—to form an extrusion die 24 which in this case can be a die base. The expansion of the discharge channel 23 and the design of the extrusion die 24 depend on the desired use. It should be specifically stressed that the section 25 does not have to be circular cylindrical in design, but normally has an oval or approximately rectangular cross-section.

The mentioned section 25 of the discharge channel 23 runs parallel to the bores 5, 6, i.e. its axis 26 is likewise parallel to the axes 7, 8. A guiding and starting bore 27 is formed in the housing 21 at right angles to the section 25, that is for example vertically, in which bore a starting valve and throttle body 28 is arranged so as to be displaceable in the direction of its longitudinal axis 29, i.e. at right angles to the axes 7, 8, 26, and rotatable about this longitudinal axis 29. The diameter D of the bore 27 is slightly greater than the width d of the section 25 of the discharge channel 23, as can be seen particularly from FIGS. 6 and 7. On both sides of the discharge channel 23 there are provided in the bore 27 guide and sealing bushes 30 in which the body 28 is sealed and guided. The starting valve and throttle body 28 has two circular cylindrical closing sections 31, 32 between which a throttle body 33 is arranged. The diameter of these two closing sections 31 and 32 is essentially equal to the diameter D.

On an inner closing section 32 there is formed, on the side remote from the throttle body 33, a starting valve body 34, the outer circumference of which—as is apparent from FIG. 3—is part-cylindrical with an extension over more than a semicircle to ensure trouble-free guiding and sealing action in the bore 27. The cross-section of this starting valve body 34 is crescent-shaped to ensure a good and trouble-free guiding and sealing action, on the one hand—as mentioned—but, on the other hand, to leave the largest possible starting outlet opening 35 in the bore 27 which leads outwards from the valve/throttle housing 21.

A profiled shaft 36 which is in alignment with the longitudinal axis 29 is fitted on the outer cylindrical closing section 31 on that side of the closing section opposite the starting valve body 34. A piston rod 37 of a linear drive comprising a hydraulically operatable piston/cylinder drive 38 is in turn mounted on this shaft 36 and is also in alignment with the longitudinal axis 29. A piston 40 which is displaceable in the cylinder 39 is attached to the piston rod 37. The drive in this case is a piston/cylinder drive 38 which can be actuated in either direction and at both ends of which there are provided hydraulic fluid connections 41, 42. The piston/cylinder drive 38 is attached to a hydraulic swivel drive 43 which in turn is mounted on the valve/throttle housing 21 by means of a support 44. The hydraulic swivel drive has a profiled disc 45 which is pivotable about the longitudinal axis 29 and in which the profiled shaft 36 is slidably, but non-rotatably arranged in the direction of the longitudinal axis 29 so that during pivoting movements of the profiled disc 45 the disc also pivots the profiled shaft 36 and thus the starting valve and throttle body 28 about the longitudinal axis 29. Hydraulic swivel drives of this type are known. Hydraulic fluid is fed and discharged via hydraulic fluid connections 46, 47.

The piston 40 of the piston/cylinder drive 38 can be moved between two end positions shown in FIGS. 2 and 4 which result in the two positions of the starting valve and throttle body 28 also shown in FIGS. 2 and 4. When the piston 40 and piston rod 37 are in the retracted position shown in FIG. 2, the starting valve body 34 is situated in the discharge channel 23 so that the latter is hereby closed, but the starting outlet opening 35 is opened so that as a result material is conveyed outwards in the direction of arrow 48 out of the bores 5, 6 in the housing 1 when the machine is started, i.e. it can be channelled outwards. The starting and throttling unit 20 is therefore in its starting position, i.e. starting function.

When the piston 40 is in the other end position, i.e. with the piston rod 37 extended out of the cylinder 39, the inner and outer closing sections 32, 31 close the bore 27 on both sides of the discharge channel 23 so that the throttle body 33, which is to be described in detail further on in the text, is situated in the discharge channel. The starting valve/throttle unit 20 is then in its throttling position, as shown in FIG. 4. In this case the starting outlet opening 35 is closed by the inner closing section 32. The guiding and starting bore 27 is closed to the drives 38 or 43 by the outer closing section 31. When in the previously described starting position shown in FIG. 2, it is closed in this direction by the inner closing section 32. The bore 27 is therefore closed in the direction of the drives 38 or 43 when in both operating positions.

When the starting valve and throttle body 28 is in the last described throttling position, the material can flow out of the bores 5, 6 of the housing 1 of the machine through the discharge channel 23 to the extrusion die 24 or another discharge element in the direction of arrow 49. To prevent the discharge channel 23 from being fully closed temporarily by the inner closing section 32 during the switchover from the starting position to throttling position, the length L of this inner closing section is slightly less than the width d of the discharge channel 23.

Figure 6:
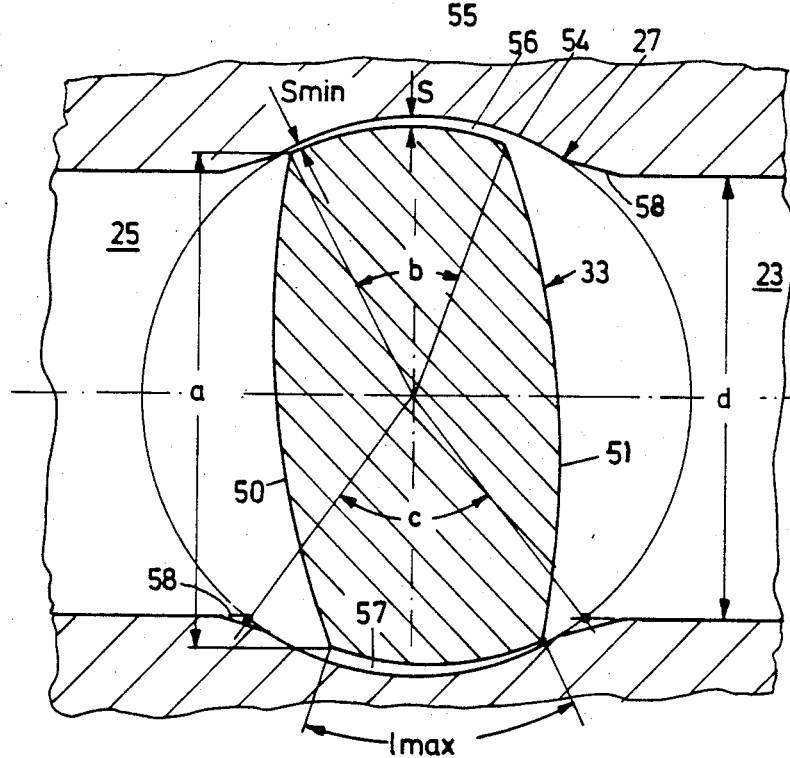
FIG. 6 shows, on a greatly enlarged scale, a throttle body from FIG. 5 in a substantially closed position.

The design and function of the throttle body 33 are explained in more detail below with the aid of FIGS. 6 and 7. The throttle body 33 has a cross-section which is defined by, interalia, two convexly curved sealing surfaces 50, 51 which lie opposite one another and have a length a greater than the width d of the section 25 of the discharge channel 23, but smaller than the diameter D of the guiding and starting bore 27. These two sealing surfaces 50, 51 are connected to one another by two throttling surfaces 52, 53 which are formed approximately, but not identically, by part-cylindrical surfaces about the the longitudinal axis 29. The opening angle b of the two throttling surfaces 52, 53 is within the range from 35° to 80°, and preferably within the range from 45° to 65°. The throttle in this case is therefore a vane-type throttle.

Variable throttle channels 56 and 57 are formed between respective throttling surfaces 52, 53 and the associated part surfaces of the guiding and starting bore 27 which serve as throttle channel bounding faces 54, 55. The bounding faces 54, 55 are formed at the point where the discharge channel 23 passes through the bore 27, that is through the area of the wall of the bore 27 which is not cut away by the discharge channel 23. The opening angle c of these bounding faces 54, 55 is generally greater than the opening angle b.

At the interconnecting point between the section 25 of the discharge channel 23 and the bounding faces 54, 55 there is formed in each case a sloping face 58, the sole purpose of which is to facilitate material flow.

As already indicated above, the throttling surfaces 52, 53 are designed not exactly part cylindrical relative to the longitudinal axis 29; the spacing s between these surfaces and the associated bounding faces 54, 55, respectively, varies continuously over the length of the throttle gaps 56 and 57, respectively, so that each throttle gap 56 and 57 has a minimum width smin relative to the direction of flow according to arrow 49 and, at the other end, a maximum width smax. If—as shown in FIG. 6—the throttle body 33 is in its maximum throttle position in which therefore the closing surfaces 50 or 51 seal the discharge channel 23 as far as possible, throttle channels 56 and 57 having a maximum possible length lmax and a minimum gap width smin are formed between respective throttling surfaces 52, 53 and associated bounding faces 54 and 55, respectively.

Figure 7:
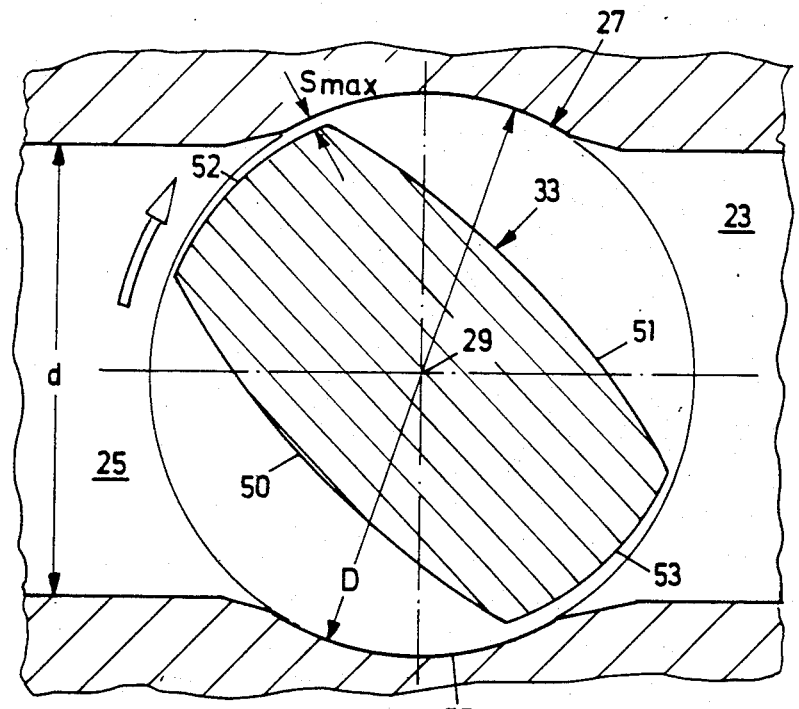
FIG. 7 shows the throttle body from FIG. 6 in a substantially open position.

If, on the other hand, the throttle body 33 is pivoted approximately into the position shown in FIG. 7, the width s of the throttling channel 56 or 57 increases to smax and the length l of each throttling channel 56 or 57 moves towards zero. If further pivoting of the throttle body 33 were to take place, the throttling channels 56 or 57 would be removed, i.e. no further throttling would take place.

The minimum gap width smin of the throttling channel 56 or 57 is, depending on the diameter of the bounding face 54 or 55, approximately 0.1 to 2% of the diameter D of the guiding and starting bore 27. The maximum gap width smax is 1.5 to 8 times greater than smin. The preferred smax gap width is 3 to 5 times smin. smax is selected in practice depending on the viscosity of the melt of the material to be processed. The higher the viscosity of the material to be processed, the greater is also the gap width s.

The maximum length lmax of each throttling channel 55 or 56 is determined from the opening angle b and the diameter D of the bounding faces 54, 55.

In the section 25 of the discharge channel 23 there is arranged, immediately in front of the guiding and starting bore 27, a pressure and/or temperature sensor 59 which measures the pressure and/or temperature of the materials conveyed by the bores 5, 6. This sensor 59 transmits the measuring signals to a control unit 60 which triggers the swivel drive 43. If, during operation of the machine with the body 28 of the starting valve/throttle unit 20 in the position shown in FIGS. 2 and 3, the material leaving the starting outlet opening 35 has the desired properties, the piston rod 37 is extended by subjecting the piston/cylinder drive 38 to pressure and the throttle body 33 is moved into the discharge channel 23, as has already been described in detail. Pressure and/or temperature fluctuations in the molten or plasticized material which are detected by the sensor 59 are converted into hydraulic fluid actuations of the swivel drive 43 and thus into pivoting movements of the throttle body 33 so that the gap width s of the throttling channels 56, 57 and the length l thereof are each controlled in such a manner that the pressure and/or temperature of the material are maintained as closely as possible at each preset desired value.

Figure 8:
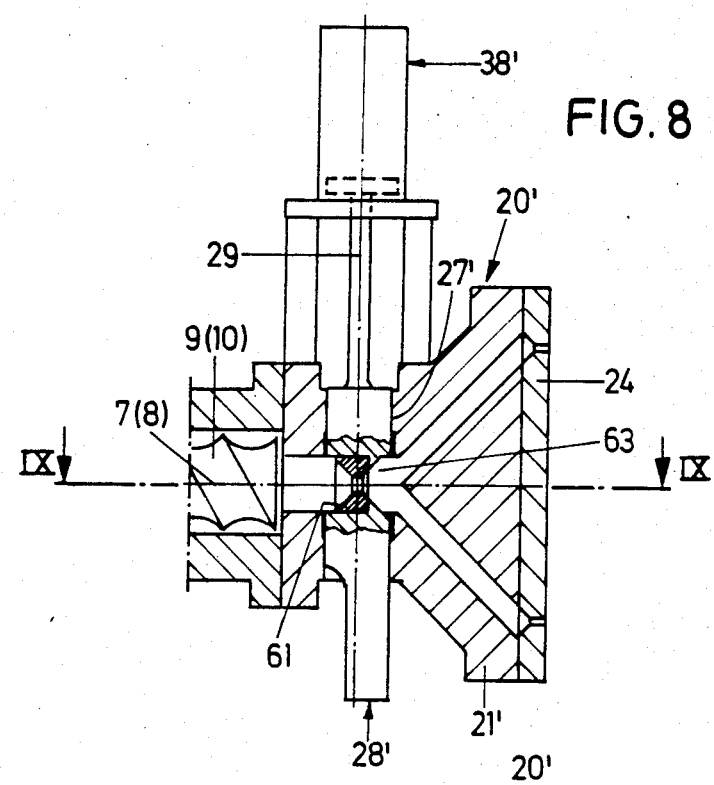
FIG. 8 shows a modified embodiment of a starting valve/throttle unit, in a vertical central section in a view similar to FIG. 4.
Figure 9:
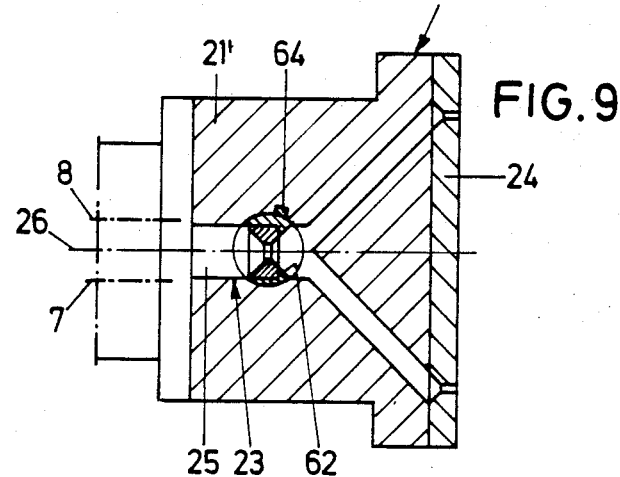
FIG. 9 shows a cross-section through FIG. 8 along the section line IX—IX in FIG. 8.

A simplified embodiment of a starting valve/throttle unit 20' is shown in FIGS. 8 and 9. Where parts which are identical to those in the previously described figures of the drawing are shown in FIGS. 8 and 9, they are designated by the same reference numerals. Where parts which are different in design, but identical in function are provided, these are designated by the already used reference numerals with a prime without a new description being required in each case.

The starting valve and throttle body 28' has a throttle body 61 in the style of an interchangeable apertured disc or screening plate which bears against a stop 62 in a cross hole 63, otherwise in alignment with the discharge channel 23, in the starting valve and throttle body 28'. The throttling conditions can be influenced by appropriate selection of this throttle body 61. If the throttle body 61 is designed in the style of a screening plate, the melt can also be filtered at the same time. A different feature from the embodiment according to FIGS. 2 to 7 is that the starting valve and throttle body 28' is not pivotable about its longitudinal axis 29. This can be ensured in the customary manner by a non-rotatable piston rod or by a keyway guide 64 between the body 28' and the valve/throttle housing 21'. The switchover from starting function to throttling function by operation of the piston/cylinder drive 38' is in this case designed in the same way as in the previously described exemplary embodiment. A swivel drive is naturally not required.

What is claimed is:
1. A screw-type extruder comprising:
   a housing (1) which is provided with at least one bore (5,6) having a first end and a second end, with a hopper (15) for receiving material and opening into said at least one bore at said first end and with a delivery channel (23) at said second end;
   at least one screw (9, 10) which is rotatably arranged in said at least one bore (5, 6) of the housing (1) and which conveys said material while melting or plasticising into a conveying direction (18) from said hopper (15) to said delivery channel (23);
   a starting valve for channeling said material out of said housing during a starting operation of the extruder and a throttle valve for generating a back pressure on the molten or plasticized material, the starting valve and the throttle valve comprising:
   a valve-throttle housing (21) having a guiding and starting bore (27), said guiding and starting bore has a starting outlet opening and passes through said delivery channel (23) and said delivery channel (23) leads into said guiding and starting bore (27) with an inlet opening and leads out of said guiding and starting bore (27) with an outlet opening and passes in a straight line through said guiding and starting bore (27);
   a starting valve and throttle body (28) which has a longitudinal axis (29) and which is arranged in said guiding and starting bore (27) so as to be displaceable at right angles to the conveying direction (18) in the direction of the longitudinal axis (29) between a first end position and a second end position of displacement, the first end position being a starting position and the second end position being a throttling position; and wherein the starting valve and throttle body (28) has two closing bodies (31, 32) and a throttle body (33), which is arranged between said two closing bodies (31, 32) and a starting valve body (34), which is arranged on one of said two closing bodies (32) remote from the throttle body (33), and wherein in said first end position of said starting valve and throttle body (28) said starting valve body (34) connects said inlet opening of the delivery channel (23) to the said starting outlet opening (35) whereby said outlet opening of said delivery channel (23) is closed, and wherein in said second end position of said starting valve and throttle body (28) said throttle body (33) connects said inlet opening to said outlet opening of said delivery channel (23), whereby said one closing body (32) on which the starting valve body (34) is arranged closes said starting outlet opening (35), and wherein the throttle body (33) is in the form of a vane-type throttle having at least one throttling surface (52, 53) which, together with at least one associated throttling channel bounding surface (54, 55) defines at least one throttling channel (56, 57) the length (1) of which is variable by pivoting the throttle body (33) about said longitudinal axis (29) to vary said back pressure on the molten or plasticized material.

2. A screw-type extruder according to claim 1, wherein the said starting valve and throttle body (28) is displaceable by means of a linear drive (38) out of said first end position into said second end position.

3. A screw-type extruder according to claim 1, wherein the starting valve and throttle body (28) is formed in one piece.

4. A screw-type extruder according to claim 2, wherein a swivel drive (43) and the linear drive (38) are connected to form a modular unit and engage on the starting valve and throttle body (28).

5. A screw-type extruder according to claim 1 wherein the width(s) of said at least one throttling channel (56, 57) is variable by said pivoting of said throttle body (33) about said longitudinal axis (29).

6. A screw-type extruder according to claim 1 wherein the distance between the at least one throttling surface (42, 53) and the at least one associated throttling channel bounding surface (54, 55) increases over the length (1) of the said at least one throttling channel (55, 56).

* * * * *